(12) United States Patent
Liu (10) Patent No.: US 7,693,979 B2
(45) Date of Patent: Apr. 6, 2010

(54) TRAFFIC FENCING MECHANISM FOR CONTROL PLANE ENABLED NETWORKS

(75) Inventor: Stephen Shyan-Shiang Liu, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 733 days.

(21) Appl. No.: 11/616,084

(22) Filed: Dec. 26, 2006

(65) Prior Publication Data

US 2008/0151768 A1    Jun. 26, 2008

(51) Int. Cl.
*G06F 15/173* (2006.01)

(52) U.S. Cl. .................................................. 709/223

(58) Field of Classification Search ................ 709/223, 709/225, 226
See application file for complete search history.

(56) References Cited

U.S. PATENT DOCUMENTS

2006/0250961 A1* 11/2006 Vasseur ...................... 370/235

OTHER PUBLICATIONS

RFC 2702. Awduche et al. "Requirements for Traffic Engineering of MPLS". http://tools.ietf.org/pdf/rfc2702.pdf. Sep. 1999.*
RFC 3212. Jamoussi et al. "Constraint-Based LSP Setup using LDP". http://tools.ietf.org/pdf/rfc3212.pdf. Jan. 2002.*
RFC 3473. Berger. Generalized Multi-Protocol Label Switching (GMPLS) Signaling Resource ReserVation Protocol-Traffic Engineering (RSVP-TE) Extensions. http://tools.ietf.org/pdf/rfc3473.pdf. Jan. 2003.*
RFC 3784. Smit. Intermiediate System to Intermediate System (IS-IS) Extensions for Traffic Engineering (TE). http://tools.ietf.org/pdf/rfc3784.pdf. Jun. 2004.*
LDP Specification. Anderson. http://tools.ietf.org/pdf/draft-ietf-mpls-rfc3036bis-04.pdf. Mar. 2007.*

* cited by examiner

*Primary Examiner*—Joon H Hwang
*Assistant Examiner*—John M MacIlwinen (57) ABSTRACT

A device receives a traffic fencing (TF) function for a network, and provides a TF attribute, based on the received TF function, over a link of the network to enable activation of a TF rule of a link state routing (LSR) algorithm used by the network to implement the TF function for the network.

21 Claims, 10 Drawing Sheets

TRAFFIC FENCING MECHANISM FOR CONTROL PLANE ENABLED NETWORKS

BACKGROUND INFORMATION

A traffic firewall or fence (TF) may regulate the types of traffic entering and/or exiting a public and/or private network (e.g., a Layer 1 optical transport network, a Layer 3 Internet Protocol (IP) network, etc.). For example, TFs may exercise control over incoming and/or outgoing traffic to or from restricted portions of a network. Many public carriers have relied upon network management systems or operation support systems (NMS/OSS) to perform TF functions. NMS/OSS may configure a network to enforce a set of rules or functions regarding traffic handled by certain portions (e.g., restricted portions) of the network. Examples of such rules may include: (1) limiting entrance of traffic of certain classes to a portion of the network; (2) preventing traffic of certain classes from exiting a portion of the network; (3) preventing traffic of certain classes from using a portion of the network as a transit route; and/or (4) isolating a portion of the network from the remaining network but permitting communication within the isolated portion.

The NMS/OSS-based approach has several drawbacks. For example, NMS/OSS may be labor intensive and prone to errors because circuit design rules may have to be manually changed and/or routing tables used for end-to-end path calculations may have to be updated. Existing NMS/OSS functions may be closely tied to a transport technology it manages and may be vendor specific. In large networks (e.g., a public carrier network), numerous technologies may be deployed on different layers of the network, and multiple vendors may be involved. Each NMS/OSS may use different procedures to create TFs, and multiplicity of NMS/OSS may further complicate management of TFs, especially if the NMS/OSS spreads across vendor domains and/or network layers.

Lack of standard interfaces between NMS/OSS and network devices, as well as a standard procedure to construct TFs, may make it very difficult to streamline and/or automate TF-related procedures. Furthermore, the current NMS/OSS-based procedure will be phased out by the deployment of an intelligent control plane (CP) in next generation transport networks (NG-TN) (e.g., next generation optical transport networks (NG-OTN)). In the near future, NMS/OSS will no longer play an active role in designing and/or routing end-to-end circuits. The CP will take over that function, along with the responsibility to create and/or manage TF functions. However, current CP standards and industry-wide implementation agreements (IAs) do not support TF functions on standard CP network interfaces.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Generalized Multiprotocol Label Switching (GMPLS) is an international standard that has been developed to support automated data plane routing and signaling functions by network equipment. GMPLS may permit a network to direct a flow of information streams or traffic along a predetermined path (e.g., a label switched path) across the network. An "information stream(s)" may include any type or form of data stream, such as packet or non-packet data streams. GMPLS may permit setting up label switched paths in a packet switched network, and may generalize this notion to set up label switched paths in non-packet switched networks traversing optical cross connects, synchronous optical network (SONET) cross connects, etc. Labels may be port numbers, timeslots, etc. In order to support this flexibility, GMPLS extended the base signaling and routing protocols provided by Multiprotocol Label Switching (MPLS).

GMPLS may allow a user to specify the start point, end point, and bandwidth required, and a GMPLS agent on the network elements may allocate the path through the network, may provision the traffic path, may set up cross-connects, and may allocate bandwidth from the paths for a user-requested service. The actual path that the traffic may take through the network may not be specified by the user.

GMPLS may support five types of transport networks (or networking technologies): (1) Internet Protocol (IP); (2) Ethernet and asynchronous transfer mode (ATM); (3) SONET/time-division multiplexing (TDM); (4) wavelength switching; and/or (5) fiber-port switching.

As defined by international standards bodies (e.g., the International Telecommunication Union (ITU), the Internet Engineering Task Force (IETF), and/or the Optical Internetworking Forum (OIF)), a control plane architecture framework may be defined by three network interfaces, a User Network Interface (UNI), an external-network network interface (E-NNI), and/or an internal-network network interface (I-NNI). A UNI may provide a demarcation point between users and a network, may be an un-trusted interface, and may provide signaling capabilities to the users. An E-NNI may provide a demarcation point that supports cross-domain connection provisioning (e.g., intra-carrier/inter-domain (trusted) connections and/or inter-carrier (un-trusted) connections), and may provide signaling with limited routing information exchanges. An I-NNI may provide an intra-domain (trusted) node-to-node interface that supports control plane functions, and may provide intra-domain signaling and/or routing functions.

An intelligent CP may support auto-discovery and/or self-inventory of network resources, topology, connection map, etc. An intelligent CP may also support end-to-end path calculations subject to TE constraints, dynamic end-to-end path setup and teardowns in a single-step and/or single-ended fashion, and/or a variety of protection and/or restoration schemes. An intelligent CP may provide several advantages, including improved network efficiency, enhanced network resiliency, new revenue opportunities, etc. However, as described above, existing CP standards do not support TF functions.

Systems and methods described herein may provide a traffic fencing or firewall (TF) mechanism for CP enabled networks (e.g., a NG-TN) that use link state routing protocols to perform end-to-end path routing. For example, the systems and methods may be fully integrated with CP standards, which may be based on GMPLS. The systems and methods may be applied to various CP interfaces (e.g., an I-NNI or E-NNI) for the transport networks supported by GMPLS, and thus, may provide a uniform mechanism to manage TF on almost all networking layers (e.g., "Layer 0" to "Layer 3"). The systems and methods may also permit automatic performance of TF functions by the GMPLS control plane.

Figure 1:
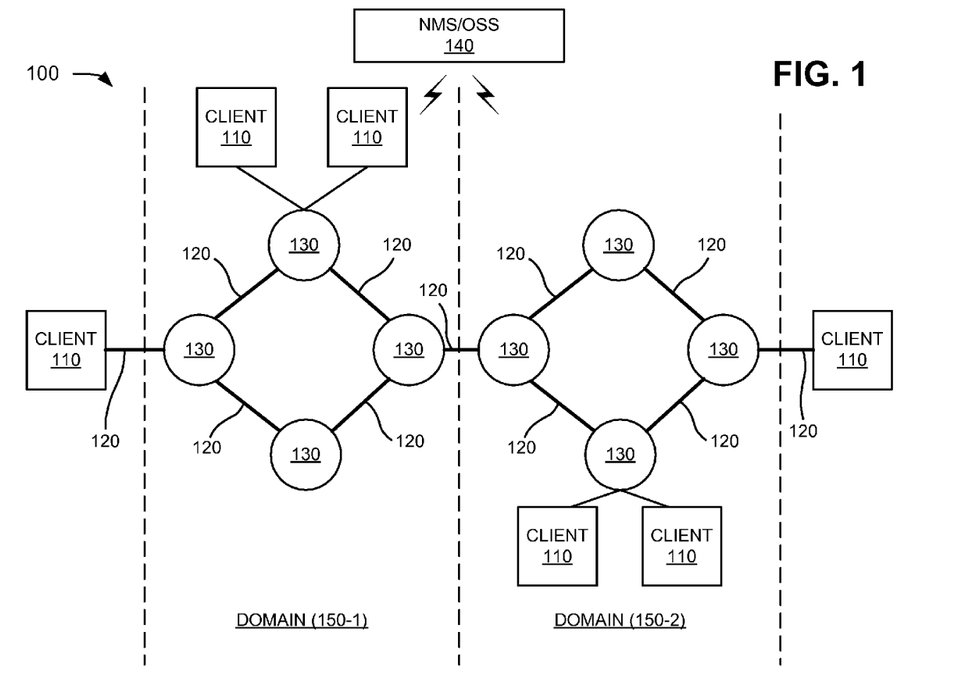
FIG. 1 depicts an exemplary network in which systems and methods described herein may be implemented.

FIG. 1 depicts an exemplary network 100 in which systems and methods described herein may be implemented. Network 100 may include multiple clients or endpoints 110, multiple network links (or links) 120, multiple network devices 130, a network management system and/or operation support system (NMS/OSS) 140, and multiple networks 150-1 and 150-2 (collectively referred to as "networks 150"). Six clients 110, eleven network links 120, eight network devices 130, one NMS/OSS, and/or two networks 150 have been illustrated for simplicity. In practice, there may be more or fewer clients, network links, network devices, NMS/OSSs, and/or networks.

Clients 110 may include client entities. An entity may be defined as a device, such as a personal computer, a telephone, a SIP telephone, a wireless telephone, a personal digital assistant (PDA), a laptop, or another type of computation or communication device, a thread or process running on one of these devices, and/or an object executable by one of these devices. Clients 110 may connect to network devices 130, may function as endpoints for network 100, and may use services provided by network 100.

Network links 120 may include a physical media that interconnects adjacent network devices 130 and/or clients 110, which may be in the same or different networks. For example, network links 120 may provide a path that permits communication among network devices 130. Network links 120 may support the following CP interfaces: I-NNI, E-NNI, and/or UNI. In one implementation, for example, network links 120 may support I-NNIs capable of providing intra-domain (trusted) node-to-node interfaces that support control plane functions, and/or capable of providing intra-domain signaling and/or routing functions. In another implementation, network links 120 may support E-NNIs capable of supporting cross-domain connection provisioning (e.g., intra-carrier/inter-domain (trusted) connections and/or inter-carrier (untrusted) connections), and/or capable of providing cross-domain signaling and routing. Network links 120 may physically connect to ports (e.g., input ports or output ports) provided on network devices 130, and may be configured by provisioning software provided in management systems of network devices 130.

Each network device 130 may include a device, such as a multiplexer, a router (e.g., a Layer 3 router), a switch (e.g., a Layer 2 switch), an optical cross connect (OCX), a hub, a bridge, a reconfigurable optical add and drop multiplexer (ROADM), a dense wavelength division multiplexer (DWDM) (e.g., a Layer 0 DWDM), or another type of computation or communication device capable of running on any Layer, a thread or process running on one of these devices, and/or an object executable by one of these devices. Additional details of network devices 130 are provided below in connection with FIGS. 2A-2C.

NMS/OSS 140 may include a device (e.g., a server) capable of supporting an intelligent CP that provides design and/or routing of end-to-end circuits, and creates and/or manages TF functions. The intelligence in NMS/OSS 140 may also configure a network to enforce a set of rules or functions regarding traffic handled by certain portions (e.g., restricted portions) of the network. Examples of such rules may include: (1) limiting entrance of traffic of certain classes to a portion of the network; (2) preventing traffic of certain classes from exiting a portion of the network; (3) preventing traffic of certain classes from using a portion of the network as a transit route; and/or (4) isolating a portion of the network from the remaining network but permitting communication within the isolated portion. Additional details of NMS/OSS 140 are provided below in connection with FIG. 3.

Networks 150 may include local area networks (LANs), wide area networks (WANs), metropolitan area networks (MANs), telephone networks (e.g., the Public Switched Telephone Network (PSTN)), intranets, the Internet, SIP-based networks, voice-over-IP (VoIP)-based networks, interactive voice response (IVR)-based networks, or a combination of networks. In one implementation, for example, networks 150 may include NG-TNs (e.g., NG-OTNs). Clients 110, network devices 130, and/or NMS/OSS 140 may interconnect and/or connect to networks 150 via wired, wireless, and/or optical connections.

In an exemplary implementation, network 100 may be a GMPLS network that includes an intelligent CP (e.g., supported by NMS/OSS 140). The intelligent CP may use link state routing protocols (LSRP) (e.g., Open Shortest Path First (OSPF), intermediate system to intermediate system (IS-IS), etc.) for intra-domain routing and/or network routing. Each link 120 in network 100 may include attributes associated with it, such as cost, capacity, unreserved bandwidth, latency, etc. A LSRP may permit the nodes (e.g., network devices 130) to dynamically coordinate and generate a coherent, current view of the complete network map/topology, such as the attributes of links 120 in network 100. The network topology generated at each node may be referred to as a "Link State Database (LSDB)." If the LSDB is synchronized among the nodes, each node may use the LSDB to construct its own forwarding table and/or to perform source routing.

The LSRP may support a wide range of routing constraints based on the availability and/or types of link attributes. For example, a link latency attribute may permit the LSRP to fulfill an end-to-end path request, which may impose an end-to-end delay. If the status of any of links 120 is changed (e.g., adding or removing links 120, changing any attribute, etc.), the LSRP may provide the change across network 100 to update the LSDBs in the nodes (e.g., network devices 130). Link attributes may be dynamically changed to reflect the real-time status of network 100.

Although FIG. 1 shows exemplary components of network 100, in other implementations, network 100 may contain fewer or additional components that may provide a TF mechanism for CP enabled networks (e.g., NG-TNs) that use link state routing protocols to perform end-to-end path routing. In still other implementations, one or more components of network 100 may perform the tasks performed by other components of network 100.

Although implementations are described below in the context of networks that use link state routing protocols to perform end-to-end path routing, in other implementations, equivalent or analogous communication protocols and/or types of transport networks (e.g., asynchronous transfer mode (ATM), frame relay, etc.) may be used. Furthermore, the systems and methods described herein may be used for any device that supports CP enabled networks using link state routing protocols to perform end-to-end path routing.

Figure 2A:
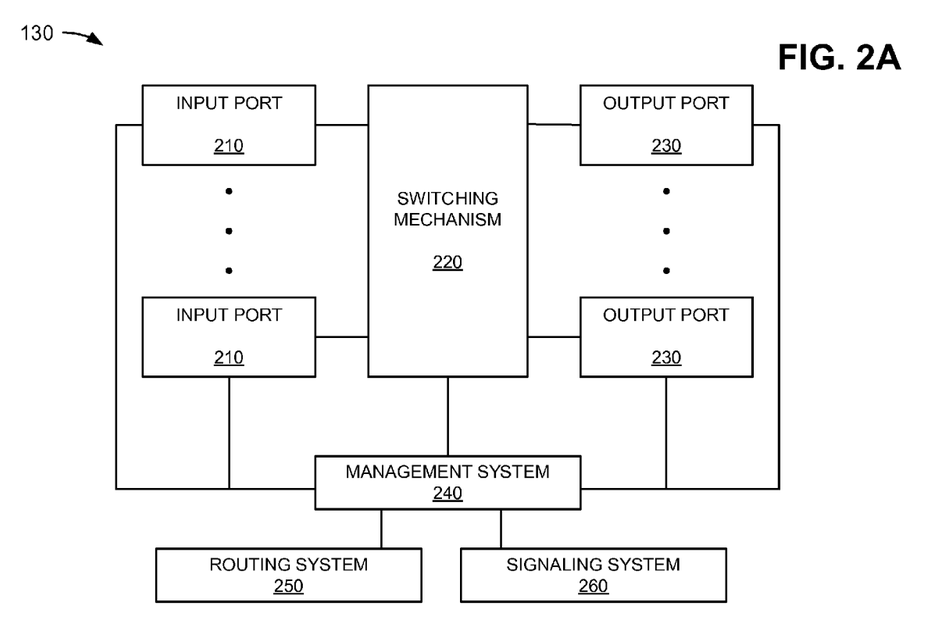
FIG. 2A depicts an exemplary network device configured to communicate via the exemplary network illustrated in FIG. 1.

FIG. 2A is an exemplary diagram of a device that may correspond to one of network devices 130. The device may include input ports 210, a switching mechanism 220, output ports 230, a management system 240, a routing system 250, and/or a signaling system. Input ports 210 may be the point of attachment for a physical link (not shown) and may be the point of entry for incoming traffic. Switching mechanism 220 may connect input ports 210 with output ports 230. Output ports 230 may store traffic and may schedule traffic for service on an output link (not shown). Management system 240 may enable communication between NMS/OSS 140 and components of network device 130. Routing system 250 may participate in routing protocols and may create a Link State Data Base (LSDB), and a forwarding table that is used in traffic forwarding. Signaling system 260 may activate end-to-end paths.

Input ports 210 may carry out service adaptation, datalink layer encapsulation and decapsulation. Input ports 210 may look up a destination address of incoming traffic in a forwarding table to determine its destination port (i.e., route lookup). In order to provide QoS guarantees, input ports 210 may classify traffic into predefined service classes. Input ports 210 may run optical layer framing protocols, datalink-level protocols, or network-level protocols.

Switching mechanism 220 may be implemented using many different techniques. For example, switching mechanism 220 may include busses, crossbars, and/or shared memories. The simplest switching mechanism 220 may be a bus that may link input ports 210 and output ports 230. A crossbar may provide multiple simultaneous data paths through switching mechanism 220. In a shared-memory switching mechanism 220, incoming traffic may be stored in a shared memory and pointers to traffic may be switched.

Output ports 230 may store traffic before it is transmitted on an output link (not shown). Output ports 230 may include scheduling algorithms that support priorities and guarantees. Output ports 230 may support datalink layer encapsulation and decapsulation, and/or a variety of higher-level protocols.

Management system 240 may connect with input ports 210, switching mechanism 220, and output ports 230. Management system 240 may communicate with NMS/OSS 140 and may perform provisioning, configuration, reporting, and/or maintenance functions for network device 130. Additional details of management system 240 are provided below in connection with FIG. 2B.

Routing system 250 may construct a LSDB, compute a forwarding table, implement routing protocols, and/or run software to configure and/or manage network device 130. Routing system 250 may handle any traffic whose destination address may not be found in the forwarding table. Routing system 250 may include a routing engine or protocol processor, a LSDB, routing tables, etc. Additional details of routing system 250 are provided below in connection with FIG. 2C.

Signaling system 260 may activate end-to-end paths and/or may implement signaling protocols for network device 130.

Although FIG. 2A shows exemplary components of network devices 130, in other implementations, network devices 130 may contain fewer or additional components than depicted in FIG. 2A. For example, in one implementation, one or more components of network devices 130 depicted in FIG. 2A may perform the tasks performed by other components of network devices 130. Although FIG. 2A shows network devices 130 as including routing system 250 (i.e., a distributed routing system for a network), in other implementations, a centralized routing system may be provided for a network and routing system 250 may be omitted from network devices 130.

Figure 2B:
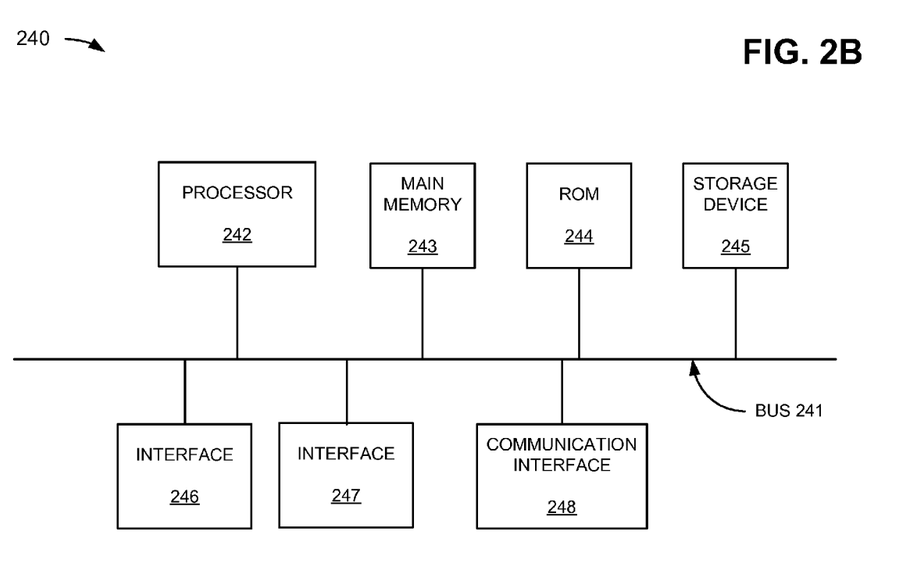
FIG. 2B is a diagram of a management system of the exemplary network device illustrated in FIG. 2A.

FIG. 2B is an exemplary diagram of a device that may correspond to management system 240 of network device 130. As shown, management system 240 may include a bus 241, a processor 242, a main memory 243, a read only memory (ROM) 244, a storage device 245, an interface 246 for input ports 210, an interface 247 for output ports 230, and a communication interface 248. Bus 241 may include a path that permits communication among the elements of management system 240.

Processor 242 may include a processor, microprocessor, or processing logic that may interpret and execute instructions. Main memory 243 may include a random access memory (RAM) or another type of dynamic storage device that may store information and instructions for execution by processor 242. ROM 244 may include a ROM device or another type of static storage device that may store static information and instructions for use by processor 242. Storage device 245 may include a magnetic and/or optical recording medium and its corresponding drive.

Interfaces 246 and 247 may include a mechanism that permits interconnection with input ports 210 and output ports 230, respectively. Communication interface 248 may include any transceiver-like mechanism that enables management system 240 to communicate with other devices and/or systems, either internal or external. For example, communication interface 248 may include mechanisms for communicating with NMS/OSS 140 or components of network device 130.

As will be described in detail below, management system 240 may perform certain traffic fencing operations. Management system 240 may perform these operations in response to processor 242 executing software instructions contained in a computer-readable medium, such as memory 243. A computer-readable medium may be defined as a physical or logical memory device and/or carrier wave.

The software instructions may be read into memory 243 from another computer-readable medium, such as data storage device 245, or from another device via communication interface 248. The software instructions contained in memory 243 may cause processor 242 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2B shows exemplary components of management system 240, in other implementations, management system 240 may contain fewer or additional components that may provide a TF mechanism for CP enabled networks that use link state routing protocols to perform end-to-end path routing. In still other implementations, one or more components of management system 240 may perform the tasks performed by other components of management system 240.

Figure 2C:
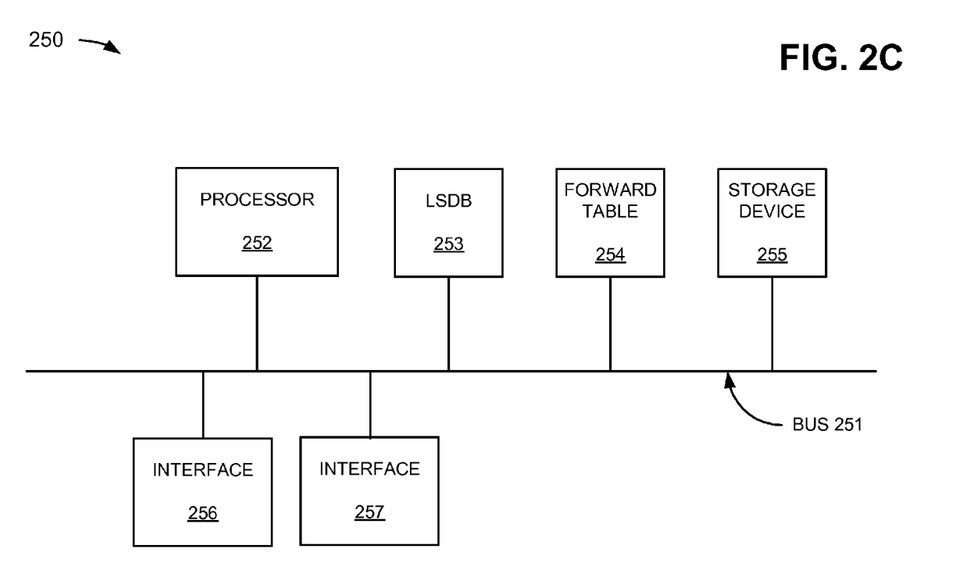
FIG. 2C is a diagram of a routing system of the exemplary network device illustrated in FIG. 2A.

FIG. 2C is an exemplary diagram of a device that may correspond to routing system 250 of network device 130. As shown, routing system 250 may include a bus 251, a processor 252, a LSDB 253, a forward table 254, a storage device 255, an interface 256 for adjacent network devices 130, and an interface 257 for management system 240.

Bus 251 may include a path that permits communication among the elements of routing system 250. Processor 252 may include a processor, microprocessor, or processing logic that may interpret and execute instructions. LSDB 253 may include a storage device that may store information and instructions for execution by processor 252. Forward table 254 may include a table that is used in traffic forwarding. Storage device 255 may include a magnetic and/or optical recording medium and its corresponding drive. Interfaces 256 and 257 may include a mechanism that permits interconnection with adjacent network devices 130 and management system 240, respectively.

As will be described in detail below, routing system 250 may perform certain traffic fencing operations. Routing system 250 may perform these operations in response to processor 252 executing software instructions contained in a computer-readable medium, such as LSDB 253. A computer-readable medium may be defined as a physical or logical memory device and/or carrier wave.

The link status information and/or software instructions may be read into LSDB 253 from another computer-readable medium, such as data storage device 255, or from another device. The information and instructions contained in LSDB 253 may cause processor 252 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2C shows exemplary components of routing system 250, in other implementations, routing system 250 may contain fewer or additional components that may provide a TF mechanism for CP enabled networks that use link state routing protocols to perform end-to-end path routing. In still other implementations, one or more components of routing system 250 may perform the tasks performed by other components of routing system 250.

Figure 3:
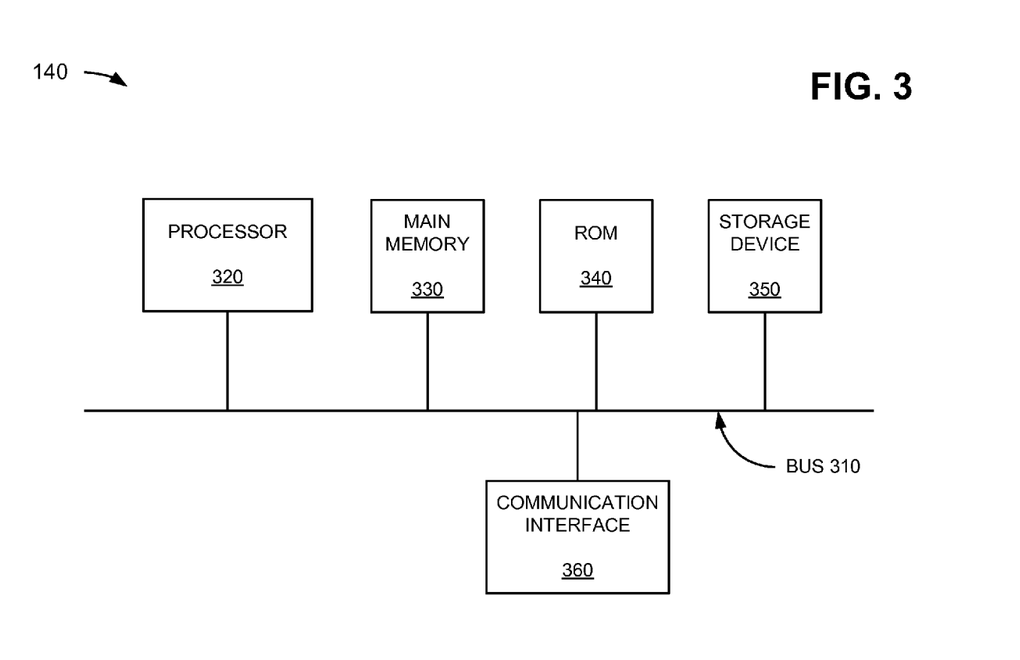
FIG. 3 is a diagram of a NMS/OSS of the exemplary network illustrated in FIG. 1.

FIG. 3 is an exemplary diagram of a device which may correspond to NMS/OSS 140. As shown, NMS/OSS 140 may include a bus 310, a processor 320, a main memory 330, a read only memory (ROM) 340, a storage device 350, and a communication interface 360. Bus 310 may include a path that permits communication among the elements of NMS/OSS 140.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Communication interface 360 may include any transceiver-like mechanism that enables NMS/OSS 140 to communicate with network devices and/or systems. For example, communication interface 360 may include mechanisms for communicating with network devices and/or systems via a network, such as network 100.

As will be described in detail below, NMS/OSS 140 may perform certain traffic fencing operations. NMS/OSS 140 may perform these operations in response to processor 320 executing software instructions contained in a computer-readable medium, such as memory 330. The software execution may be directly or indirectly triggered by network events and/or network operator inputs. A computer-readable medium may be defined as a physical or logical memory device and/or carrier wave.

The software instructions may be read into memory 330 from another computer-readable medium, such as data storage device 350, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of NMS/OSS 140, in other implementations, NMS/OSS 140 may contain fewer or additional components that may provide a TF mechanism for CP enabled networks that use link state routing protocols to perform end-to-end path routing. In still other implementations, one or more components of NMS/OSS 140 may perform the tasks performed by other components of NMS/OSS 140.

The TF mechanism described herein may include two parts. A first part of the TF mechanism may introduce a new link attribute (i.e., a TF attribute) that may be designed for TF operation. A second part of the TF mechanism may specify extensions of link state routing algorithms to handle the TF attributes and to achieve desired TF functions. As described below in connection with FIG. 5, the TF mechanism may be implemented by, for example, NMS/OSS 140 in cooperation with network devices 130. The TF mechanism may prevent unauthorized access to or from a public/private or restricted network (e.g., networks 150) or portions thereof. The TF mechanism may be implemented in hardware, software, or a combination of both.

Figure 4:
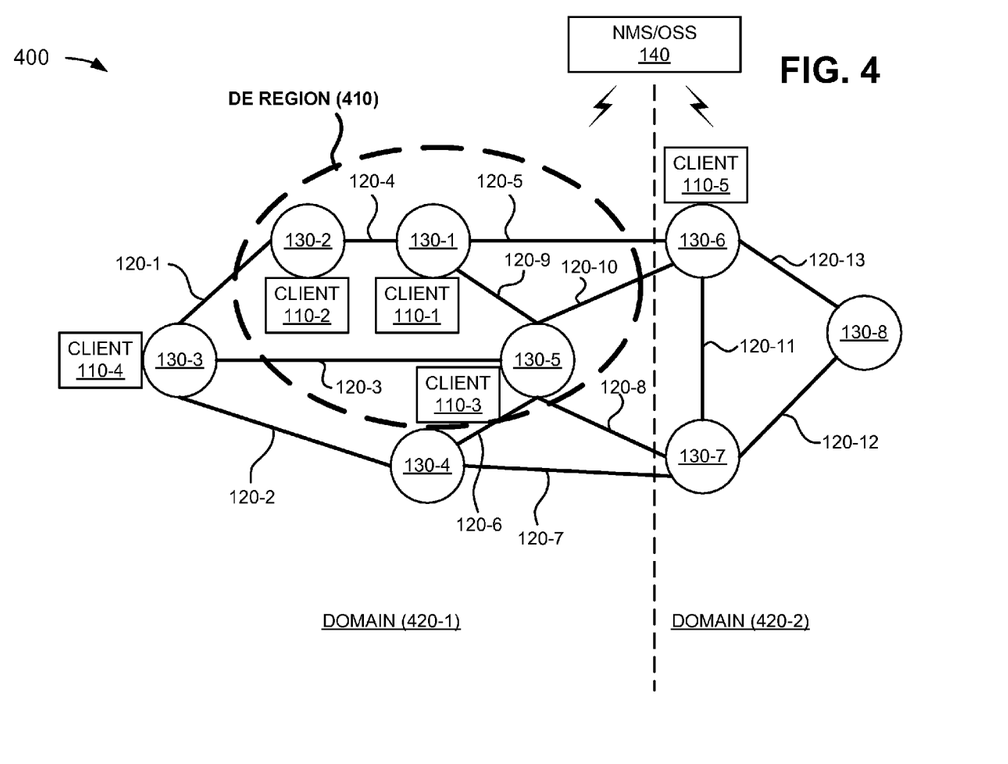
FIG. 4 is a diagram of an exemplary traffic fencing (TF) implementation in the exemplary network illustrated in FIG. 1.

FIG. 4 is a diagram of an exemplary TF implementation (e.g., a dead end (DE) TF) provided in exemplary network 400. A DE fence may be used to mark a region (e.g., DE region 410) of network 400 that may exclude transit traffic. The size of DE region 410 may range from one node to multiple nodes across multiple domains. For example, based on customer needs or some unexpected event in network 400, an operator may decide to fence off DE region 410. The operator may define DE region 410 by identifying the ingress links to the region. The operator may then utilize NMS/OSS 140 to instruct affected network devices 130 to configure and turn ON a DE TF link attribute on ingress links to DE region 410.

As shown in FIG. 4, network 400 may include two domains, i.e., domain 420-1 and domain 420-2. The two domains may be connected by links 120-5, 120-7, 120-8, and 120-10 (e.g., E-NNIs), and, within each domain, links 120-1, ..., 120-4, 120-6, 120-9, and 120-11 (e.g., I-NNIs) may be provided between adjacent network devices 130. Assume for this exemplary implementation that one DE region (e.g., DE region 410) is declared in network 150-1 at three nodes (e.g., network devices 130-1, 130-2, and 130-5) due to some event(s) in DE region 410.

In this exemplary implementation, to create DE region 410 such that the CP may not route new traffic through DE region 410 before reaching a desired destination, NMS/OSS 140 turns on and sets DE type TF attributes over links 120 in the ingress or in-coming direction to DE region 410, i.e., links 120-1, 120-3, 120-5, 120-6, 120-8, and 120-10. The DE type TF attributes in the egress or out-going direction over links 120-1, 120-3, 120-5, 120-6, 120-8, and 120-10 are not set in this exemplary implementation.

To handle the DE TF, the link state routing (LSR) algorithm may be pre-enhanced with an additional TF rule. The additional TF rule may provide that when calculating an end-to-end path for traffic, the algorithm may not consider using any link that has the DE TF attribute set, but may consider using a link that has the DE TF attribute set if any destination end point or client 110, attached to any network device 130 (e.g., network devices 130-1, 130-2, and 130-5), lies within DE region 410. By implementing the additional TF rule, the link state routing algorithm may steer transit traffic away from DE region 410. However, end points or clients 110 within DE region 410 (e.g., clients 110-1, 110-2, and 110-3 attached to network devices 130-1, 130-2, and 130-5) may freely receive traffic and/or send traffic to other parts of network 400. If NMS/OSS 140 turns ON the DE TF attribute, the LSR algorithm may automatically activate the TF rule to implement DE region 410 in the defined links 120 and network devices 130.

Completion of the two parts of TF mechanism may ensure that new circuits may be routed around DE region 410, except when the destination end points lie inside DE region 410. For example, if client 110-4 wants to send traffic from network device 130-3 (or a network resource connected thereto) to client 110-5 attached to network device 130-6, TF mechanism may route traffic from network device 130-3, via network devices 130-4 and 130-7, to network device 130-6, thus, avoiding routes across DE region 410. In another example, TF mechanism may route traffic from client 110-4 attached to network device 130-3 to client 110-1 attached to network device 130-1, via links 120-1 and 120-4. In this example, the destination client 110-1 lies within DE region 410, thus link 120-1 may be used even the DE TF attribute of link 120-1 is set.

Although FIG. 4 shows exemplary components of network 400, in other implementations, network 400 may contain fewer or additional components that may provide a TF mechanism for CP enabled networks that use link state routing protocols to perform end-to-end path routing. In still other implementations, one or more components of network 400 may perform the tasks performed by other components of network 400. Furthermore, although FIG. 4 shows using the TF mechanism to support a DE TF function, in other implementations, the TF mechanism may be used to support other TF functions.

Figure 5:
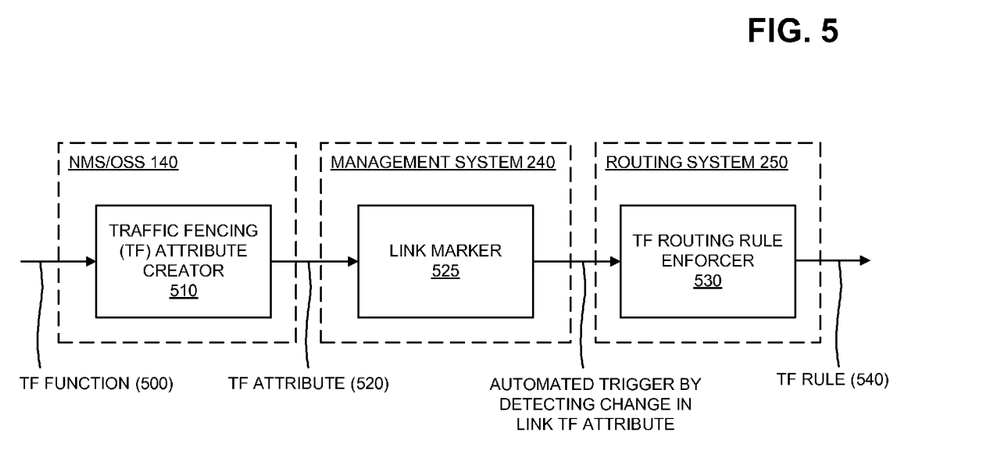
FIG. 5 is an exemplary functional relationship diagram between the NMS/OSS shown in FIGS. 1 and 3, the management system shown in FIG. 2B, and the routing system shown in FIG. 2C.

FIG. 5 is an exemplary functional relationship diagram of NMS/OSS 140, management system 240, and routing system 250. As shown, NMS/OSS 140 may receive a TF function 500 (e.g., from an operator), and may include a TF attribute creator 510 capable of generating a TF attribute and region (TF attribute/region 520). Management system 240 may receive TF instruction from NMS/OSS 140, may configure the TF attributes on involved outgoing and/or incoming links or ports, and may include a link marker 525. Routing system 240 may run link state routing procedures, may detect a change of TF attributes on links involved in a TF operation, may enforce or deactivate a TF routing rule, and may include a TF routing rule enforcer 530.

TF function 500 may include a variety of TF function types. For example, TF function 500 may include limiting entrance of traffic of certain classes to a portion of a network, preventing traffic of certain classes from exiting a portion of the network, preventing traffic of certain classes from using a portion of the network as a transit route, isolating a portion of the network from the remaining network but permitting communication within the isolated portion, etc.

TF attribute creator 510 may receive TF function 500 (e.g., indicating a desire for creation of a DE region in a network), and may generate a new attribute (e.g., TF attribute/region 520) in addition to other existing link attributes. TF attribute/region 520 may indicate an ON/OFF state of TF function 500 for a link 120, may indicate a type of TF function 500 that may be applied if TF function 500 is in an ON state, and may indicate a TF region. TF attribute/region 520 may be coded by TF attribute creator 510 in a similar manner as existing link attributes are coded in LSRPs. For example, with the OSPF link state routing protocol of GMPLS, there may be two possible ways to add TF attribute/region 520 into the OSPF LSDB. First, TF attribute/region 520 may be coded as a Type/Length/Value (TLV) triplets (e.g., of four-octet) value in which the most significant bit may be coded as an ON/OFF flag bit and the remaining bits (e.g., thirty-one bits) may be coded to represent various types of TF functions (e.g., a DE TF function). Routing system 250 in each of network devices 130 may advertise the created TF TLV in the OSPF TE Link State Advertisement (LSA).

In the second way to code TF attribute/region 520, a subset of an existing Administrative Group bit mask (e.g., "Resource Class" or "Link Color") may be designated to represent the TF type and its ON/OFF state on a link. For example, an X-bit sub-field of the Administrative Group bit mask may be allocated to TF attribute/region 520. One bit may be allocated as the ON/OFF flag bit, and the remaining X−1 bits may be used to indicate one of possible $2^{(X-1)}$ types of TFs. Routing system 250 in each of network devices 130 may advertise the Administrative Group bit mask in the OSPF TE LSA. Although creation of TF attribute/region 520 has been described with reference to the OSPF link state routing protocol of GMPLS, in other implementations TF attribute/region 520 may be statically or dynamically configured depending on operations requirements of network 100.

As further shown in FIG. 5, NMS/OSS 140 (e.g., TF attribute creator 510) may provide TF attribute/region 520 to management systems 240 in affected network devices 130, and may instruct link markers 525 in management systems 240 to configure TF attributes for affected links. The changes in link TF attributes may trigger routing systems 250 in the affected network devices 130 to advertise the new TF attributes throughout network 100. TF routing rule enforcer 530 may activate the link state routing TF function and may enforce a TF routing rule 540.

With the LSBD containing TF attribute/region 520, TF routing rule enforcer 530 may enforce or activate TF rule 540 of the LSR algorithm to handle TF attribute/region 520 during end-to-end path calculations. Specific enhancement of the algorithm may be a function of the type of TF desired. Many types of TFs may be developed based on the networking environment and policy of the network. TF routing rule enforcer 530 may activate TF rule 540 based on TF attribute/region 520 and/or the type of TF function 500. For example, in one implementation described above in connection with FIG. 4, to handle the DE type TF, TF routing rule enforcer 530 may activate a DE TF rule of the algorithm. DE TF rule may provide that when calculating an end-to-end path for traffic, the algorithm may not consider using any link that has the DE TF attribute set, but may consider using a link that has the DE TF set if a destination end point or client 110 (e.g., clients 110-1, 110-2, and 110-3) lies within DE region 410 attached to the link. By implementing TF rule 540, the link state routing algorithm may steer transit traffic away from DE region 410. However, end points within DE region 410 (e.g., clients 110-1, 110-2, and 110-3) may freely receive traffic and/or send traffic to other parts of network 400.

If TF attribute/region 520 and TF rule 540 have been generated, the TF operation specified by TF function 500 may be performed within a network (e.g., one of networks 150).

Although FIG. 5 shows exemplary functional components of each NMS/OSS 140, management system 240, and routing system 250, in other implementations, NMS/OSS 140, management system 240, and routing system 250 may contain fewer or additional functional components that may provide a TF mechanism for CP enabled networks that use link state routing protocols to perform end-to-end path routing.

Figure 6:
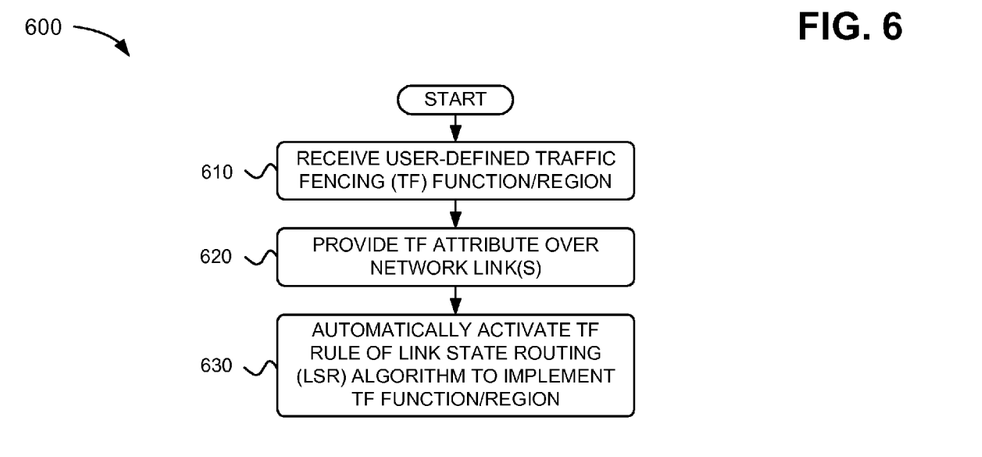
FIGS. 6-8 depict flowcharts of exemplary processes according to implementations described herein.
Figure 7:
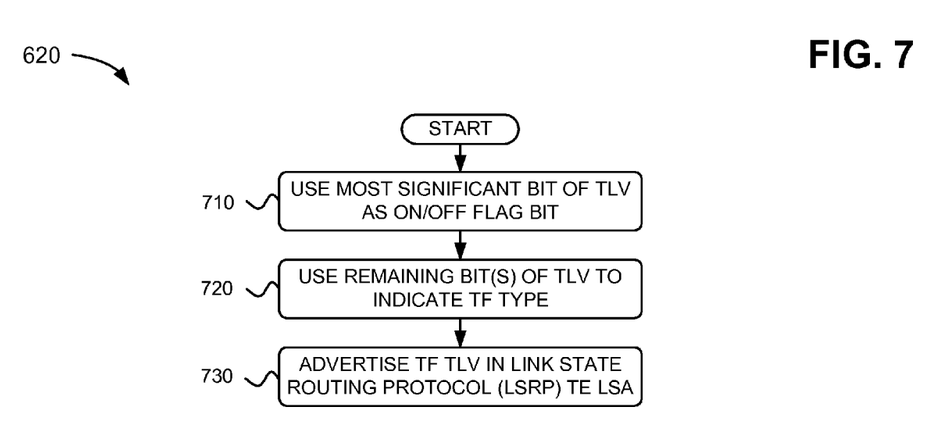
Figure 8:
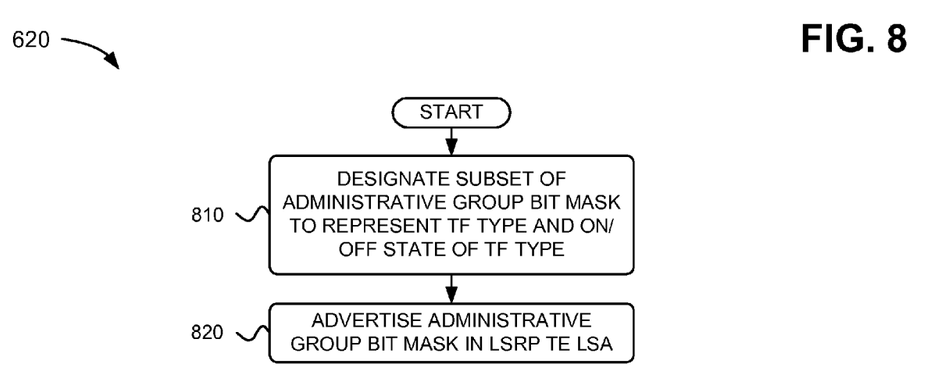

FIGS. 6-8 depict flowcharts of exemplary processes capable of being performed by NMS/OSS 140, management system 240, and routing system 250. As shown in FIG. 6, a process 600 may begin by receiving a user-defined TF function and/or region (block 610). For example, in one implementation described above in connection with FIG. 5, TF attribute creator 510 of NMS/OSS 140 may receive TF function 500 (e.g., indicating a desire for creation of a DE region in a network). TF function 500 may include limiting entrance of traffic of certain classes to a portion of a network, preventing traffic of certain classes from exiting a portion of the network, preventing traffic of certain classes from using a portion of the network as a transit route, isolating a portion of the network from the remaining network but permitting communication within the isolated portion, etc.

Process 600 may provide a TF attribute over a link(s) of a network based on the received TF function (block 620). For example, in one implementation described above in connection with FIG. 5, TF attribute creator 510 may generate a new attribute (e.g., TF attribute/region 520) in addition to other existing link attributes. TF attribute/region 520 may indicate the ON/OFF state of TF function 500 for a link, may indicate a type of TF function 500 that may be applied if TF function 500 is in an ON state, and may indicate a TF region.

As further shown in FIG. 6, process 600 may automatically activate a TF rule, based on the received TF function, of a link state routing (LSR) algorithm to implement the TF function and/or region (block 630). For example, in one implementation described above in connection with FIG. 5, TF routing rule enforcer 530 of routing system 250 may activate the TF rule of the LSR algorithm to handle TF attribute/region 520 during end-to-end path calculations. Specific enhancement of the algorithm may be a function of the type of TF desired. Many types of TFs may be developed based on the networking environment and policy of the network. TF routing rule enforcer 530 may activate TF rule 540 based on TF attribute/region 520 and/or the type of TF function 500.

FIG. 7 shows an exemplary implementation of process blocks related to process block 620. As shown, process block 620 may use a most significant bit of a TLV as an ON/OFF flag bit (block 710). For example, in one implementation described above in connection with FIG. 5, with the OSPF link state routing protocol of GMPLS, TF attribute/region 520 may be coded as a TLV triplets (e.g., of four-octet) value in which the most significant bit may be coded as an ON/OFF flag bit indicating an ON/OFF state of TF function 500.

Process block 620 may use the remaining bit(s) of the TLV to indicate a TF type (block 720). For example, in one implementation described above in connection with FIG. 5, with the OSPF link state routing protocol of GMPLS, TF attribute/region 520 may be coded as a TLV triplets value in which the remaining bits (e.g., other than the bit coded as the ON/OFF flag bit) may be coded to represent various types of TF functions (e.g., a DE TF function).

As further shown in FIG. 7, process block 620 may advertise the created TF TLV in a LSRP TE LSA (block 730). For example, in one implementation described above in connection with FIG. 5, routing system 250 in network devices 130 may advertise the created TF TLV in the OSPF TE Link State Advertisement (LSA).

FIG. 8 shows another exemplary implementation of process blocks related to process block 620. As shown, process block 620 may designate a subset of an administrative group bit mask to represent a TF type and an ON/OFF state of the TF (block 810). For example, in one implementation described above in connection with FIG. 5, with the OSPF link state routing protocol of GMPLS, a subset of an existing Administrative Group bit mask (e.g., "Resource Class" or "Link Color") may be designated to represent the TF type and its ON/OFF state on a link. In one example, an X-bit sub-field of the Administrative Group bit mask may be allocated to TF attribute/region 520. One bit may be allocated as the ON/OFF flag bit, and the remaining X−1 bits may be used to indicate one of possible $2^{(X-1)}$ types of TFs.

Process block 620 may advertise the administrative group bit mask in a LSRP TE LSA (block 820). For example, in one implementation described above in connection with FIG. 5, routing system 250 in network devices 130 may advertise the Administrative Group bit mask in the OSPF TE LSA.

Systems and methods described herein may provide a TF mechanism for CP enabled networks that use link state routing protocols to perform end-to-end path routing. For example, the systems and methods may be fully integrated with CP standards, which may be based on GMPLS. The systems and methods may be applied to various CP interfaces (e.g., an I-NNI or E-NNI) for the transport networks supported by GMPLS, and thus, may provide a uniform mechanism to manage TF on almost all networking layers (e.g., "Layer 0" to "Layer 3"). The systems and methods may also permit automatic performance of TF functions by the GMPLS control plane. If the systems and methods implement the TF mechanism, CP routing may automatically enforce the TF in a network.

The foregoing description provides illustration and description, but is not intended to be exhaustive or to limit the embodiments to the precise form disclosed. Modifications and variations are possible in light of the above teachings or may be acquired from practice of the invention.

For example, while series of acts have been described with regard to the flowcharts of FIGS. 6-8, the order of the acts may differ in other implementations. Further, non-dependent acts may be performed in parallel.

Embodiments, as described above, may be implemented in many different forms of software, firmware, and hardware in the implementations illustrated in the figures. The actual software code or specialized control hardware used to implement embodiments consistent with principles of the invention is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving a traffic fencing (TF) function for a network; and
   providing a TF attribute, based on the received TF function, over a link of the network to enable activation of a TF rule of a link state routing (LSR) algorithm used by the network to implement the TF function for the network, where the providing the TF attribute comprises:
   using a most significant bit of a Type/Length/Value (TLV) triplets value to indicate an ON/OFF state of the TF function, and
   using remaining bits of the TLV value to indicate a type of the TF function.

2. The method of claim 1, wherein the providing the TF attribute comprises:
  designating a subset of an administrative group bit mask to represent the type of the TF function and the ON/OFF state of the TF function.

3. The method of claim 1, wherein the TF rule of the LSR algorithm is activated to handle the TF attribute during end-to-end path calculations for the network.

4. The method of claim 1, wherein the TF rule at least one of:
  limits entrance of traffic of certain classes to one or more portions of the network;
  prevents traffic of certain classes from exiting one or more portions of the network;
  prevents traffic of certain classes from using one or more portions of the network as a transit route; or
  isolates one or more portions of the network from remaining portions of the network and permitting communication within the isolated portion or portions.

5. The method of claim 1, wherein the TF rule creates a dead end region within one or more portions of the network.

6. The method of claim 5, wherein the TF rule implements the TF attribute in an ingress direction to the dead end region and does not implement the TF attribute in an egress direction from the dead end region.

7. A system comprising:
  a network device;
  a link connected to the network device; and
  a network management system or operation support system (NMS/OSS) to:
    receive a traffic fencing (TF) function for the network device, and
    provide a TF attribute, based on the received TF function, over the link to enable activation of a TF rule of a link state routing (LSR) algorithm used by the network device to implement the TF function for the network device, where, to provide the TF attribute, the NMS/OSS is further to:
      use a most significant bit of a Type/Length/Value (TLV) triplets value to indicate an ON/OFF state of the TF function, and
      use remaining bits of the TLV value to indicate a type of the TF function.

8. The system of claim 7, wherein the network device comprises at least one of:
  a multiplexer;
  an optical cross connect (OCX);
  a router;
  a switch;
  a hub; or
  a bridge.

9. The system of claim 7, wherein the link supports at least one of:
  an external-network network interface (E-NNI); or
  an internal-network network interface (I-NNI).

10. The system of claim 7, wherein the TF function comprises at least one of:
  a function to limit entrance of traffic of certain classes to the network device;
  a function to prevent traffic of certain classes from exiting the network device;
  a function to prevent traffic of certain classes from using the network device as a transit route; or
  a function to isolate the network device from a network.

11. The system of claim 10, wherein the network comprises a control plane enabled network that uses link state routing protocols (LSRPs) to perform end-to-end path routing.

12. The system of claim 11, wherein the network comprises a Generalized Multiprotocol Label Switching (GMPLS) network.

13. The system of claim 7, where the network device is to:
  advertise the created TF TLV in a link state routing protocol (LSRP) traffic engineered (TE) Link State Advertisement (LSA).

14. The system of claim 7, where, to provide the TF attribute, the NMS/OSS is further to:
  designate a subset of an administrative group bit mask to represent the type of the TF function and the ON/OFF state of the TF function.

15. The system of claim 14, where the network device is to:
  advertise the created administrative group bit mask in a link state routing protocol (LSRP) traffic engineered (TE) Link State Advertisement (LSA).

16. The system of claim 7, wherein the TF rule of the LSR algorithm is activated to handle the TF attribute during end-to-end path calculations.

17. The system of claim 7, wherein the TF rule at least one of:
  limits entrance of traffic of certain classes to the network device;
  prevents traffic of certain classes from exiting the network device;
  prevents traffic of certain classes from using the network device as a transit route; or
  isolates the network device from a network.

18. A system comprising:
  a network management system or operation support system (NMS/OSS) including:
    a traffic fencing (TF) attribute creator for receiving a traffic fencing (TF) function for a network and for providing a TF attribute, based on the received TF function, over links of the network; and
  network devices interconnected by the links, each network device including:
    a link marker for marking links bordering a TF region of the network with the TF attribute, and
    a TF routing rule enforcer for activating a TF rule of a LSR algorithm used by the network,
  where the TF attribute creator uses a most significant bit of a Type/Length/Value (TLV) triplets value to indicate an ON/OFF state of the TF function, and uses remaining bits of the TLV value to indicate a type of the TF function, and
  where the network devices advertise the created TF TLV in a link state routing protocol (LSRP) traffic engineered (TE) Link State Advertisement (LSA).

19. The system of claim 18, where:
  the TF attribute creator designates a subset of an administrative group bit mask to represent type of the TF function and the ON/OFF state of the TF function; and
  the network devices advertise the created administrative group bit mask in a link state routing protocol (LSRP) traffic engineered (TE) Link State Advertisement (LSA).

20. The system of claim 18, wherein the TF routing rule enforcer at least one of:
  activates the LSR algorithm to limit entrance of traffic of certain classes to one or more portions of the network;
  activates the LSR algorithm to prevent traffic of certain classes from exiting one or more portions of the network;
  activates the LSR algorithm to prevent traffic of certain classes from using one or more portions of the network as a transit route; or activates the LSR algorithm to isolate one or more portions of the network from remaining portions of the network and permitting communication within the isolated portion or portions.

21. The system of claim 18, wherein the network comprises a Generalized Multiprotocol Label Switching (GMPLS) network.

* * * * *